United States Patent
Bedingfield et al.

(10) Patent No.: US 6,810,113 B1
(45) Date of Patent: Oct. 26, 2004

(54) METHODS AND SYSTEMS TO MAKE SPOKEN NAME DATA AVAILABLE

(75) Inventors: James Carlton Bedingfield, Lilburn, GA (US); Navneet Patel, Marietta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/476,055

(22) Filed: Dec. 30, 1999

Related U.S. Application Data (60) Provisional application No. 60/121,883, filed on Feb. 26, 1999.

(51) Int. Cl.$^7$ ............................................... H04M 1/64

(52) U.S. Cl. ................. 379/88.18; 379/88.17

(58) Field of Search ................. 379/67.1, 221.08, 379/221.09, 201.07, 207.14, 88.12, 88.16, 88.17, 88.18, 88.22, 88.23, 88.25, 88.27; 709/220–229

(56) References Cited

U.S. PATENT DOCUMENTS

| | | | |
|---|---|---|---|
| 4,930,152 A | | 5/1990 | Miller |
| 4,933,967 A | | 6/1990 | Lo et al. |
| 5,058,152 A | | 10/1991 | Solomon et al. |
| 5,274,696 A | * | 12/1993 | Perelman ............... 379/88.19 |
| 5,353,331 A | | 10/1994 | Emery et al. |
| 5,361,295 A | | 11/1994 | Solomon et al. |
| 5,425,091 A | | 6/1995 | Josephs |
| 5,493,607 A | | 2/1996 | Arumainayagam et al. |
| 5,521,969 A | | 5/1996 | Paulus et al. |
| 5,572,578 A | * | 11/1996 | Lin et al. ............... 379/88.18 |
| 5,572,583 A | | 11/1996 | Wheeler, Jr. |
| 5,680,442 A | | 10/1997 | Bartholomew et al. |
| 5,684,862 A | * | 11/1997 | Finnigan ............... 379/88.22 |
| 5,692,033 A | | 11/1997 | Farris |
| 5,712,903 A | | 1/1998 | Bartholomew et al. |
| 5,717,742 A | | 2/1998 | Hyde-Thomson |

(List continued on next page.)

FOREIGN PATENT DOCUMENTS

| | | |
|---|---|---|
| EP | 0255325 | 2/1988 |
| EP | 0412799 | 2/1991 |
| EP | 0507125 | 10/1992 |
| EP | 0543235 | 5/1993 |
| EP | 0624967 | 11/1994 |
| EP | 0662762 | 7/1995 |
| EP | 0 782 304 A2 | 7/1997 |
| EP | 0 782 315 A2 | 7/1997 |

(List continued on next page.)

OTHER PUBLICATIONS

Article entitled "An Enhanced Message Networking Topology: Multimedia Messaging with the Intuity™ Interchange Server," Bell Labs Technical Journal, Apr.–Jun. 1998, pp 124–135.

"Die T–Net–Box–der Anrufbeantworter im Netz", XP–000861610, 1998.

(List continued on next page.)

*Primary Examiner*—Roland Foster
(74) *Attorney, Agent, or Firm*—Cantor Colburn LLP (57) ABSTRACT

Methods and systems allow use of a TCP/IP or other network for a message sender's messaging platform (MP1) to engage in a query/response exchange using a standardized protocol such as LDAP with a directory or an other messaging platform to obtain spoken name data associated with a recipient of a message from the sender. If available, the directory responds to the MP1 with the spoken name data. If unavailable at the directory, the directory may retrieve the spoken name data from an other messaging platform, or may provide MP1 with profile data indicating the location of the spoken name data. If MP1 does not receive the spoken name data from the directory, then MP1 may use the profile data to obtain the spoken name data from the location indicated. Once MP1 receives the spoken name data, MP1 makes a presentation to the sender.

17 Claims, 6 Drawing Sheets

U.S. PATENT DOCUMENTS

| | | | |
|---|---|---|---|
| 5,740,230 A | 4/1998 | Vaudreuil | |
| 5,740,231 A | 4/1998 | Cohn et al. | 379/89 |
| 5,742,763 A | 4/1998 | Jones | |
| 5,742,769 A | 4/1998 | Lee et al. | |
| 5,742,905 A | 4/1998 | Pepe et al. | |
| 5,764,747 A | 6/1998 | Yue et al. | |
| 5,768,348 A | 6/1998 | Solomon et al. | |
| 5,790,637 A | 8/1998 | Johnson et al. | |
| 5,812,639 A * | 9/1998 | Bartholomew et al. | 370/352 |
| 5,812,670 A | 9/1998 | Micali | |
| 5,832,072 A | 11/1998 | Rozenblit | |
| 5,832,221 A | 11/1998 | Jones | |
| 5,838,768 A | 11/1998 | Sumar et al. | |
| 5,848,132 A | 12/1998 | Morley et al. | |
| 5,905,774 A | 5/1999 | Tatchell et al. | |
| 5,930,479 A | 7/1999 | Hall | |
| 5,940,478 A | 8/1999 | Vaudreuil et al. | |
| 6,002,751 A * | 12/1999 | Shaffer | 379/88.18 |
| 6,005,845 A | 12/1999 | Svennesson et al. | |
| 6,064,723 A | 5/2000 | Cohn et al. | |
| 6,148,069 A | 11/2000 | Ekstrom et al. | |
| 6,169,795 B1 | 1/2001 | Dunn et al. | |
| 6,209,100 B1 | 3/2001 | Robertson et al. | |
| 6,226,359 B1 | 5/2001 | Montogomery et al. | |
| 6,233,318 B1 | 5/2001 | Picard et al. | |
| 6,243,374 B1 | 6/2001 | White et al. | |
| 6,301,349 B1 | 10/2001 | Malik | |
| 6,317,484 B1 | 11/2001 | McAllister | |
| 6,330,079 B1 | 12/2001 | Dugan et al. | |
| 6,339,640 B1 | 1/2002 | Chen et al. | |
| 6,650,737 B2 * | 11/2003 | Finnigan | 379/88.02 |
| 2002/0039407 A1 * | 4/2002 | O'Donovan et al. | 379/67.1 |

FOREIGN PATENT DOCUMENTS

| | | |
|---|---|---|
| EP | 0782316 A2 | 7/1997 |
| EP | 0813162 A2 | 12/1997 |
| EP | 0825752 A2 | 2/1998 |
| EP | 0841796 A2 | 5/1998 |
| EP | 0843453 A2 | 5/1998 |
| EP | 0886228 A2 | 12/1998 |
| EP | 0841796 A3 | 8/1999 |
| WO | WO 97/08901 | 3/1997 |
| WO | PCT/US/05002 | 2/2000 |

OTHER PUBLICATIONS

"Voice Services on the Intelligent Network: Intelligent Peripherals and Service Nodes", F. Bosco, XP-000607359, Aug. 1992.

"The Belcore and ITU–T Call Model Operations", XP-002141946, 1998.

"Transactions in Intelligent Networks", XP-002141947, 1998.

"General Recommendations on Telephone Switching and Signalling—Introduction to Intelligent Network Capability Set 1", International Telecommunication Union, XP-002141945, Mar. 1993.

\* cited by examiner

METHODS AND SYSTEMS TO MAKE SPOKEN NAME DATA AVAILABLE

RELATED APPLICATION

The present application claims priority to and the benefit of the prior filed copending and commonly owned provisional application entitled "Spoken Name Reply to Voice Message Using Light-Weight Directory Access Protocol" filed in the United States Patent and Trademark Office on Feb. 26, 1999, assigned application Ser. No. 60/121,883, and incorporated herein by reference.

TECHNICAL FIELD

The present inventions relate to messaging systems, and particularly, relate to embodiments that present a sender of message with an announcement of a name or other information related to the recipient.

BACKGROUND

Telecommunications systems allow people to directly communicate over the telephone or other communication devices. Messaging systems have added features to telecommunications systems to allow people to also indirectly communicate in different ways. A common way for a person to indirectly communicate with another person is by "rollover messaging", which is also commonly referred to as "telephone answering messaging". In rollover messaging, a person calls another person, who fails to answer the call, and the calling person is transferred to a voicemail system to leave the other person a message that is referred to as a "rollover message". A rollover message generally is a voicemail message left on a messaging system if the called person fails to answer a call. The person leaving the message is referred to as the "caller", and the person for whom the message is intended is referred to as the "recipient".

Rollover messaging generally includes a voicemail announcement feature that is provided when a caller reaches a recipient's messaging system to leave a rollover message. The voicemail announcement may be the enunciation of the person's name associated with the number dialed, or other information related to the recipient. For example, a caller leaving a rollover message may be greeted with a voicemail announcement such as: "You have reached the voice mailbox of Carl Bedingfield. Please leave a message." Alternatively, the caller may simply be presented with the recipient's name such as: "Navneet Patel." The voicemail announcement typically is in the form of a speech file recorded by or for the recipient.

Advantageously, the voicemail announcement is made by the recipient's system and received by the caller on an almost universal basis. Whether the recipient is using a network rollover service, an answering machine, or other device, the caller is provided with and hears the voicemail announcement typically whatever the type, model, age, brand, or manufacturer of communications device the caller is using. The caller generally hears the voicemail announcement whether he or she is using a local service provider for a local call or is calling over a long distance through a long distance carrier. Rollover messaging assures the recipient that rollover calls to the recipient's number are almost always provided with a voicemail announcement. As a result of this assurance, rollover messaging and the voicemail announcement feature have been well received by subscribers in their roles as recipients of voicemail messages.

Callers, who receive the voicemail announcement as part of rollover messaging, also have positively reacted to rollover messaging. The voicemail announcement feature has been well received because in one aspect the voicemail announcement functions as a confirmation or an alarm to the caller, who is about to leave a rollover message. The voicemail announcement serves as a confirmation when the caller hears the name of his or her intended recipient in the voicemail announcement. The voicemail announcement serves as an alarm when the caller does not hear the name of his or her intended recipient in the voicemail announcement.

Rollover messaging, however, is not the only indirect way of communicating through the use of messaging systems. Another way of indirectly communicating is by sending a message to another person's messaging system. This manner of indirect communication differs from rollover messaging in that the person sending the message does not try initially to call the recipient. Rather, the person just sends a message. Hence, this manner of indirect communication is referred to simply as "messaging" or "messaging service". The person sending the message is referred to as the "sender", and the person receiving the message is referred to as the "recipient". The message may be a voicemail message or other type of message. The recipient may reply with a voicemail or other message, or the recipient may forward the message to others.

Messaging service differs from rollover messaging in at least another respect. Few messaging systems provide a feature such as or similar to the voicemail announcement feature used in rollover messaging to senders using a messaging service. A reason that an announcement feature is not typically provided to a message sender is that unlike in rollover messaging, the differences between the respective messaging systems or platforms of the sender and the recipient typically do not allow for such an announcement feature. The differences prevent the respective messaging systems or platforms from communicating to provide the announcement feature. The differences may exist as a result of a sender using a first type, model, or brand of messaging system or platform, and the recipient using a different type, model, or brand of messaging system or platform. The differences also may exist as a result of differences between the respective systems or platforms (or even other elements of same) in the use of protocols (types, versions), encoded information, programming, configuration, etc.

Generally, the messaging systems that provide a feature such as or similar to the voicemail announcement feature to senders using a messaging service provide such a feature only in limited circumstances. One such limited circumstance occurs when the sender of a message and a recipient are served by the same messaging platform. When a sender and a recipient are served by the same messaging platform, there are few if any issues related to differences that would prevent implementation of the announcement feature.

Another limited circumstance when an announcement feature is available in a messaging service occurs when the sender of a message and a recipient are served by the same messaging system that provides generally the same messaging services to the sender and the recipient. When a sender and a recipient are served by the same messaging system, then the messaging system may take action to eliminate or at least minimize any differences between the messaging services provided to the sender and the recipient. With the elimination of the differences, the announcement feature may then be provided to subscribers.

Except in the limited circumstances pointed out above, the differences in messaging systems or platforms generally preclude the provision of an announcement feature to a sender with respect to a message to be sent to a recipient. The respective systems or platforms are generally unable to communicate so as to exchange the information necessary to provide the announcement feature. Thus, there generally is no way for a messaging system to obtain information about a recipient to provide an announcement to the sender—at least until after the message has been sent. But an announcement provided after the message has been sent does not offer the same advantages of an announcement that is provided prior to the message being sent.

By failing to provide the sender with an announcement as to the recipient's identity when a sender sends a message to a recipient, the sender is deprived of the benefit of a confirmation that his or her message will be made available to the intended recipient. The sender also is deprived of the benefit of the alarm provided when the announcement conveys information other than what the sender expects. Without the announcement, the sender then has the choice of sending a message without confirmation that his or her message will reach the intended recipient, or of communicating with the intended recipient by other means.

Accordingly, there is a need for a method or system for use in connection with messaging systems that generally would allow messaging services to provide senders with announcements or other information regarding the recipients of messages even in the circumstances when the respective messaging systems or platforms include differences such as differences of type, brand, model, or other differences.

SUMMARY

The present inventions generally relate to methods and systems that present a sender an identity or other information associated with the number or mailbox provided by the sender when the sender uses messaging in a messaging system to transmit a message to a recipient.

Advantageously, the embodiments of the present inventions implement the spoken name announcement feature for use in messaging between messaging platforms that may use different protocols or encoding techniques for spoken name data or other information. For example, exemplary embodiments use a standardized protocol such as the lightweight directory access protocol (LDAP) and/or operate in a transmission control protocol network/internet protocol (TCP/IP) network. With the implementation of the spoken name announcement feature, the sender is accorded the benefit of a confirmation that his or her message will be made available to the recipient intended by the sender. The sender also is accorded the benefit of the alarm provided when the spoken name announcement conveys information unrelated to the intended recipient.

An exemplary embodiment includes a messaging system serving a sender. When the sender desires to send a message to a recipient, the sender may contact a messaging platform and indicate a desire to send a message. (To send a message may include to reply to a message or to forward a message.) The sender dials or otherwise inputs the number or other information associated with the recipient. The messaging platform may use a standardized protocol such as LDAP to transmit a query to obtain profile data related to the number provided by the sender. By being related to the number dialed by the sender, the profile data corresponds to the recipient. The messaging platform may use LDAP to transmit the query via a TCP/IP network. The query also may contain an encoding attribute that identifies the voice encoding format of the spoken name data preferred by the messaging platform. If necessary, in addition, the query may contain one or more other attributes that identify the preferred format or configuration of other elements so that the spoken name data may be provided by the messaging platform to the sender.

A directory receives the query from the messaging platform. The directory generally stores profile data corresponding to subscribers who are served by the messaging system. In general, the profile data includes an identification such as a domain name (or other address such as a point code) of the messaging platform serving the recipient, if the recipient is a subscriber of the messaging system. The directory uses LDAP to respond to the query from the messaging platform with a response including the profile data. The profile data may or may not include the spoken name data related to the recipient of the message. The directory may use LDAP to transmit the response via a TCP/IP network.

In an exemplary embodiment, prior to transmitting the response to the messaging platform, the directory may take further action if the profile data does not include the spoken name data. The directory may obtain the spoken name data from the messaging platform serving the recipient. The directory may obtain the spoken name data by using a standardized protocol such as by engaging in an LDAP query/response exchange via a TCP/IP network. Once the spoken name data has been obtained, then the directory may include the spoken name data in the response to the messaging platform serving the sender.

If the profile data or other information received from the directory includes the spoken name data, then the messaging platform serving the sender uses that spoken name data to announce a spoken name to the sender. This announcement is confirmation the message will be made available to the recipient intended by the sender.

If the profile data fails to include the spoken name data, then the messaging platform may use the information provided in the profile data to obtain the spoken name data. The messaging platform serving the sender may use a standardized protocol such as LDAP and the identification of the messaging platform serving the recipient to transmit a query to obtain the spoken name data from the messaging platform serving the recipient. The messaging platform serving the sender may transmit the query via a TCP/IP network. The query also may contain an encoding and/or other attribute that identifies the voice encoding format and/or other information or element of the spoken name data preferred by the messaging platform.

In response to the query from the messaging platform serving the sender, the messaging platform serving the recipient then may use LDAP to respond to the query with a response including the spoken name data. If appropriate, prior to inclusion of the spoken name data in the response to the query, the messaging platform serving the recipient may convert the spoken name data and/or other information or elements to the format or configuration preferred by the messaging platform serving the sender. Alternatively, the messaging platform serving the recipient may provide information in the response as to the encoding format and/or other configuration of the data or information in the response.

The messaging platform serving the recipient may transmit the response via a TCP/IP network. After receiving the response from the messaging platform serving the recipient, the messaging platform serving the sender uses the spoken name data to announce a spoken name (or other information) to the sender. The announcement is confirmation the message will be made available to the intended recipient. As noted, the response may include information as to the encoding and/or other configuration of the spoken name data and/or other information or elements. This information may be used by the messaging platform serving the sender to convert, configure, or otherwise change the spoken name data and/or other information received from the messaging paltform serving the recipient so that the messaging platform serving the sender may provide the spoken name data in an announcement to the sender.

The spoken name announcement feature may be used in similar fashion in other aspects of a messaging system. For example, a subscriber may receive a message from another subscriber. The subscriber who received the message may desire to reply to the message. In the course of preparation of a reply message, the replying subscriber may use the spoken name announcement feature to refresh or confirm his or her recollection as to the identity or other information associated with the subscriber who left the message.

Alternatively, the subscriber who received the message may not desire to send a reply, but simply may desire additional information regarding the message. Such additional information typically is provided in the form of envelope information, which provides information about the message such as the time of its receipt, its length, etc. The subscriber who received the message may use the spoken name announcement feature to obtain data or additional information with respect to the envelope information regarding the received message. For example, the envelope information may lack the name of the person who sent the message. The recipient may implement the spoken name announcement feature to obtain the name or other identity information with respect to the sender.

Whether the subscriber who received the message uses the spoken name announcement feature with respect to a reply message or to envelope information, the actions to obtain the spoken name data for the announcement are generally carried out in the same manner as described above in connection with a sender using messaging to send a message to a recipient.

In sum, the embodiments of the present inventions provide a sender who is preparing or sending a message to a recipient, with information relating to the recipient, such as the recipient's name. Advantageously, the recipient's name or other information may be announced or otherwise presented to the sender and such presentation may be made to the sender prior to the message being sent to the recipient.

DETAILED DESCRIPTION

The present inventions generally relate to embodiments that provide an announcement or otherwise present a sender with an identity or other information associated with the number, mailbox, or other address of a recipient of a message the sender intends for the recipient.

Exemplary Environment for Exemplary Embodiments

The exemplary embodiments of the present inventions are used, preferably, with a region-wide messaging (RWM) system, as described in greater detail below. Nevertheless, the exemplary embodiments may be used with any type of messaging system with the appropriate functionality.

The region-wide messaging system described herein generally allows a subscriber to the messaging system within the region of the service provider to engage in messaging by sending, receiving, forwarding, and replying to messages, including voicemail messages, faxes, Internet data (including voice-over-Internet messages), and other electronic data.

Figure 1:
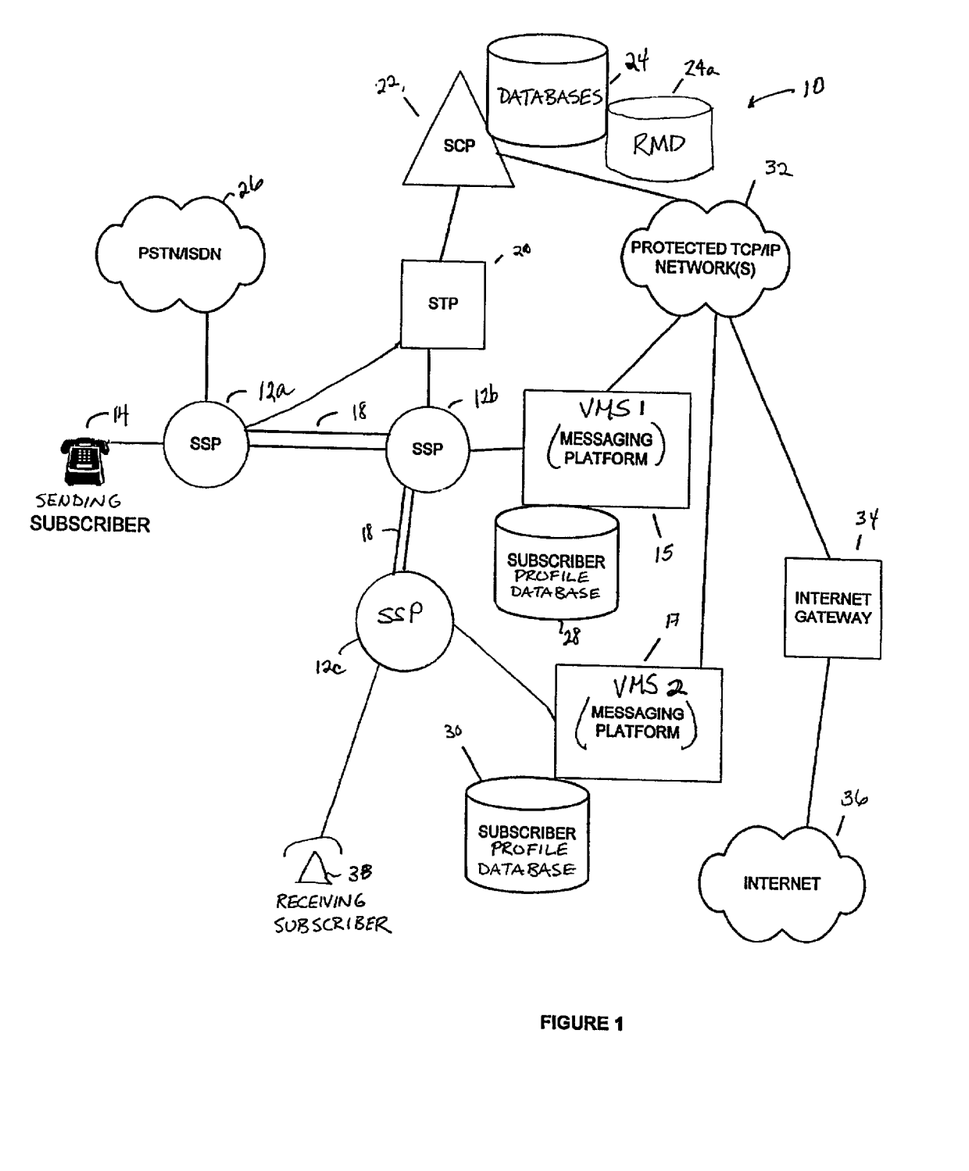
FIG. 1 is an exemplary environment wherein exemplary embodiments of the present inventions may be implemented and may operate.

Exemplary System—FIG. 1

FIG. 1 is a block diagram of an exemplary system 10 wherein exemplary embodiments of the present inventions may be implemented or operated. The system 10 includes a variety of interconnected network elements. A group of such elements includes the plurality of end offices, which are indicated as service switching points (SSPs or switches) 12a, 12b, 12c. An SSP typically includes switch functionality, but also includes other functionality so as to communicate with other network elements, and in particular, with Advanced Intelligent Network (AIN) elements. SSP 12a and SSP 12c are each coupled to a subscriber line, which also may be referred to as a line or calling line. Each SSP 12a, 12b, 12c serves a designated group of lines, and thus, the SSP that serves a particular line may be referred to as its serving switch. The line is typically connected to a piece of terminating equipment including a telephone 14. Although a telephone 14 is illustrated as the terminating equipment, such terminating equipment may include other telecommunication devices including facsimile machines, computers, modems, etc. End offices may further be coupled through a tandem office (not illustrated), which may be used to connect and switch circuits between and among end offices.

Each active line in an AIN is assigned a ten digit (NPA-NXX-XX XX) line number regardless of whether seven or ten digits are dialed to reach the subscriber. A line number is commonly referred to as a number, telephone number, destination number, or a directory number.

SSP 12b is connected by trunks (Signaling System 7 (SS7)) to a voice mail system (VMS1) 15. (These trunks use SS7 signals for call set-up and other actions and are referred to as SS7 trunks.) SSP 12c is connected by SS7 trunks to a voice mail system (VMS2) 17. A voice mail system (VMS) also may be referred to as a messaging platform (MP).

SSPs 12a, 12b, 12c are interconnected by a plurality of trunk circuits 18. These are the voice path trunks that interconnect the SSPs to connect communications. Each of the SSPs may be connected to another type of AIN element referred to as a local signal transfer point (STP) 20 via respective data links. Currently, these data links employ a signaling protocol referred to as Signaling System 7 (SS7). Much of the intelligence of the AIN resides in yet another type of element referred to as a service control point (SCP) 22 that is connected to STP 20 over an SS7 data link. Among the functions performed by the SCP 22 is the maintenance of network databases and subscriber databases as represented collectively by databases 24.

In order to keep the processing of data and calls as simple as possible, a relatively small set of triggers is defined at the SSPs for each call. A trigger in the AIN is an event associated with a particular call that generates a packet to be sent to an SCP. The SCP queries its databases or service package applications (SPAs) for processing instructions with respect to the particular call. The results are sent back to the SSP in response from the SCP 22 through STP 20. The return packet includes instructions to the SSP on how to process the call. The instructions may be to take some special action as a result of a customized calling service or an enhanced feature. In response to the instructions, the SSP moves through the remaining call states, may encounter further triggers, and generates further packets that are used to set up and route the call. Similar devices for routing calls among various local exchange carriers are provided by regional STP (not illustrated) and by regional SCP (not illustrated) which may be connected to STP 20, SCP 22, and/or to the elements described herein through the public switched telephone network (PSTN) 26.

When a subscriber (such as the person or entity using telephone 14) subscribes to messaging service, an entry including profile data relating to the subscriber is created in a VMS such as VMS 15 or 17. Each VMS 15, 17 includes or is functionally connected to a subscriber profile database 28, 30. Each subscriber profile database stores subscriber-specific profile data for retrieval by VMS functions.

While the specific details of the VMS 15, 17 are vendor-specific, the VMS preferably has several capabilities. Each VMS 15, 17 includes subscriber administration, message retrieval, send, reply, forward, and mailbox maintenance functions, among others. Each VMS 15, 17 also has certain interface capabilities, including the ability to originate and terminate SS7 calls. In addition, the VMS 15, 17 have TCAP messaging ability.

Of course, the VMS 15, 17 are elements of the messaging system 10. To the protected TCP/IP network(s) 32 described below, the messaging platforms look like valid electronic (e-mail) destinations. In support of this, each VMS 15, 17 may be assigned a TCP/IP (or IP) address and/or a domain name. Generally, the IP or other address or domain name of the VMS 15, 17 may be stored in a region-wide messaging directory (RMD) 24a (discussed below), or may be stored on some domain name service (not illustrated) in the protected TCP/IP network(s) 32, or some other element. In further support of this TCP/IP capability, the VMS 15, 17 may also provide operations access to, two standard Internet mail administrative destinations, in addition to subscriber messaging mailbox destination. These destinations may include: "postmaster@mp168.mps.com" and "non-mailuser@mp168.msp.com" (where "mp168.mps.com" in these destinations is the address of the VMS). In addition, each VMS is an SS7 network element and as such is assigned a point code such as a destination point code (DPC).

The VMS 15, 17 communicate with the SSP and the SCP according to the AIN 0.2 Switch—Intelligent Peripheral Interface Generic Requirements—1129-CORE Specification, AINGR: Switch-Intelligent Peripheral Interface (IPI)(A module of AINGR, FR-15); Document Number: GR-1129; Issue Number: 03; Updates: REV 01—October 1997; Issue Date: September 1997; Product Type: Industry Requirements and Standards (RS); Component of FR-15, which is incorporated herein by reference. This 1129 Spec describes the use of a Remote Operations parameter for indicating the invocation of a supplementary service. The service is identified by an operation value. The Remote Operations Parameter may be used to allow the SCP and the VMS to share information regarding a subscriber to the messaging system.

In this messaging system, Internet messaging is allowed via a private Transmission Control Protocol/Internet Protocol (TCP/IP) network (protected TCP/IP network(s)) 32. The VMS 15, 17 through the network 32 routes Lightweight Directory Access Protocol (LDAP) queries and responses to the proper destination/recipient. The routing scheme may be based on a combination of the area code (NPA), other elements of a directory number, and/or the service provider. For example, a VMS may send an LDAP query to the SCP with a destination address of 404@rwm-.bellsouth.com. A domain name server (not illustrated) (DNS or domain server) associated with the TCP/IP network 32 routes the LDAP query to the SCP 22 including a messaging directory 24a associated or included in the SCP 22 for processing and returns a response. The TCP/IP network 32, using addresses from an LDAP query, transports Voice Profile for Internet Mail (VPIM) encoded messages between VMS 15, 17 and other VMS within the network 10. The LDAP query is used to determine routing for a message.

An Internet gateway 34 provides secure access between the private TCP/IP network 32 and the Internet 36. The gateway 34 limits the access of VPIM traffic to and from the Internet 36. In addition, the gateway 34 performs authorized LDAP messaging directory lookups to route messages received from the Internet 36.

Region-Wide Messaging Directory (RMD)

The SCP 22 is coupled to or includes one or more databases 24 and a Region-Wide Messaging Directory (RMD) 24a. The RMD provides high-speed directory lookup for messaging subscribers. Generally, an RMD stores information referred to as profile data so as to determine which messaging platform of the system serves which subscriber. Additional information on the manner in which the RMD of the messaging system 10 stores information on messaging platforms and subscribers and how an RMD interacts with network elements is provided in the commonly owned patent application entitled "Methods and Systems for Determining Messaging Routing Based on Elements of a Directory Number," filed in the United States Patent and Trademark Office on Dec. 13, 1999, assigned Ser. No. 09/459,498, and incorporated herein by reference.

The RMD includes an interface for the Light-Weight Directory Access Protocol (LDAP). The RMD may act as both a client and a server with respect to LDAP. Particularly, the RMD acts as an LDAP server in responses to queries for subscriber profile data (also referred to as profile data) from clients. The queries typically are LDAP v.2 formatted queries. In addition, the RMD acts as an LDAP client when the RMD retrieves the spoken name data from a messaging platform. The spoken name data also may be referred to herein as spoken name verification. The RMD stores the subscriber profile data which may include subscriber, service, and other messaging data. LDAP clients may retrieve the profile data relating to a particular subscriber or number from the RMD. In addition, the RMD supports the LDAP attributes field for LDAP clients to choose the fields that they desire to retrieve from the server. As noted, the RMD also acts as an LDAP client to retrieve spoken name data from the VMSs. Each VMS has a unique domain name associated with it. The RMD stores the domain name of the subscriber's VMS in the service data of the subscriber's profile data.

Subscriber data may be stored in the RMD in the following exemplary fashion:

| Description/Directory Field | LDAP DN Attribute |
| --- | --- |
| Subscriber's Mailbox Number | CN (Common Name) |
| Name Announcement | Spoken Name |
| MDSBlocking | N/A |

Subscriber data is used to look up subscribers in the RMD. The data is also used for the purposes of routing and billing subscriber calls to and from the messaging platforms.

Service data may be stored in the RMD as follows:

| Description/Directory Field | LDAP DN Attribute |
| --- | --- |
| VMS ID | VMSID |
| VMS DAP Number | VMSDN |
| VMS Domain | Domain |
| VoiceEncoding | N/A |
| LATA | N/A |
| State | N/A |
| StateLATA | N/A |
| LDAP Credentials | Included in LDAP query |
| VMS IP address | Included in LDAP query |

The service data contains messaging platform-specific information to perform certain checks during directory look-up and call routing. The RMD may also store service provider data to ensure that a service provider has access to only its authorized subscribers' information.

Exemplary Methods

Figure 2A:
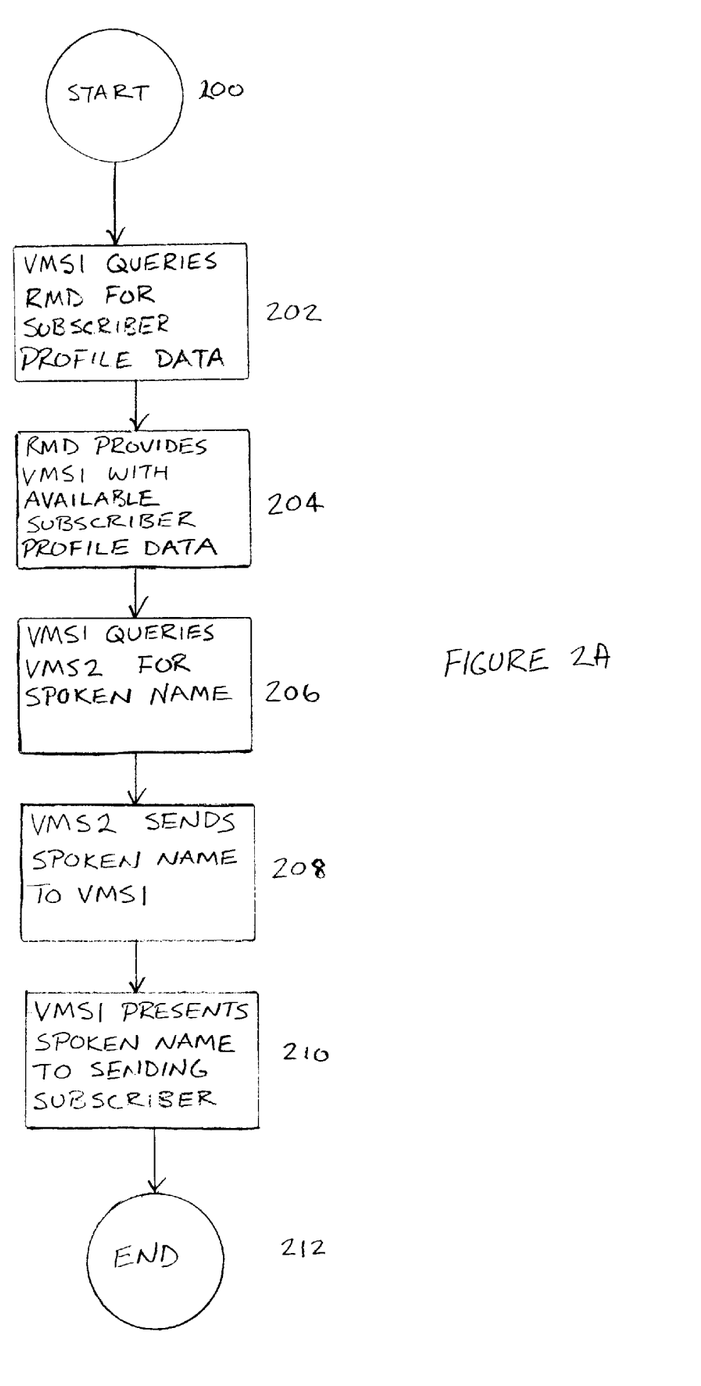
FIG. 2A is a flow chart illustrating an exemplary method of the present inventions.
Figure 2B:
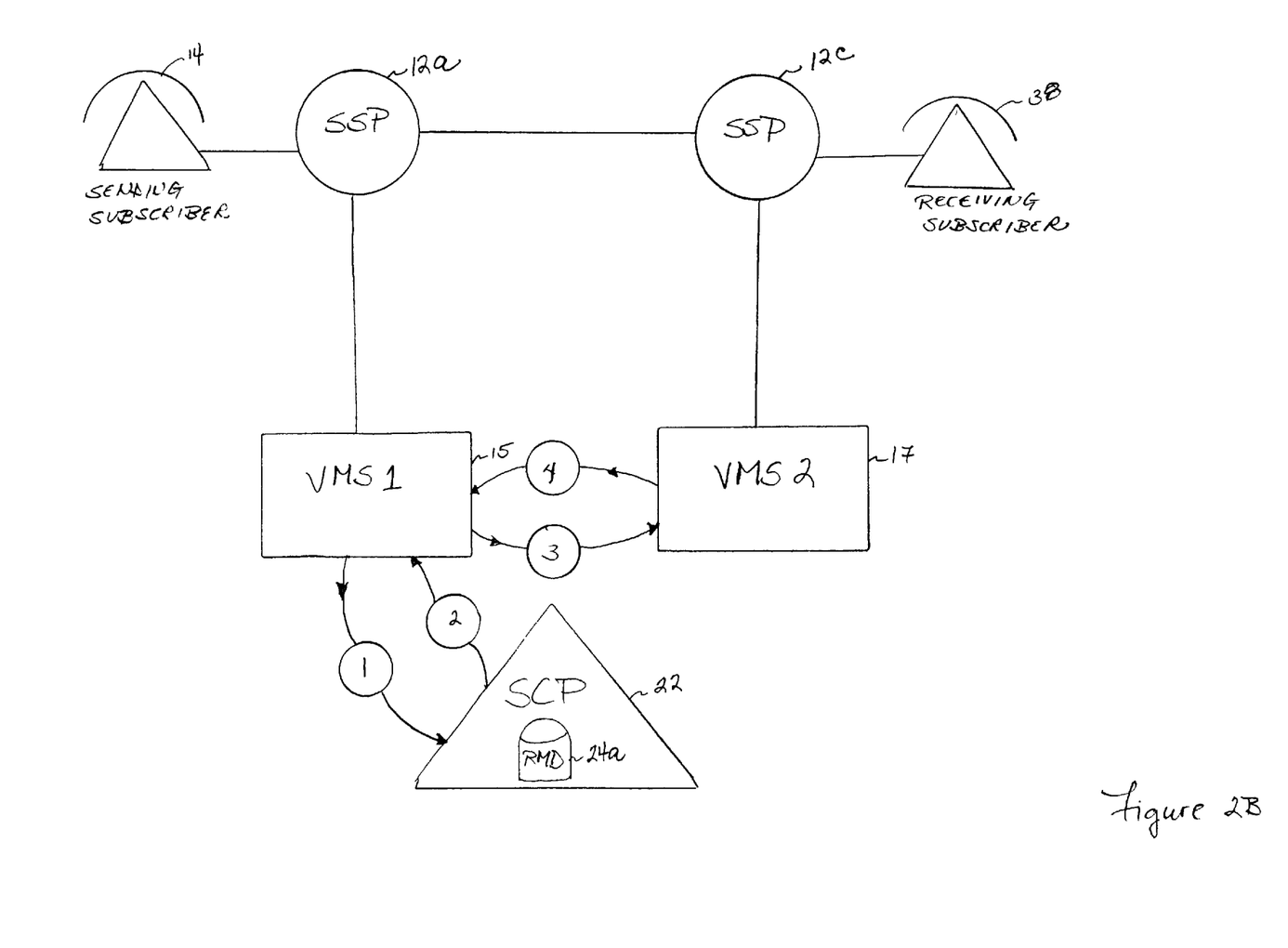
FIG. 2B is a block diagram illustrating the exemplary method of FIG. 2A.

When a sender sends a message, replies to a message, or forwards a message to a recipient, the sender 14 typically contacts or is in contact with his or her messaging platform (VMS1) 15. When the sender indicates a desire to send, reply, or forward a message, the VMS1 obtains the number for the destination of the message from the sender. The VMS1 may already have the number if the sender is replying to a message. In response, the VMS1 takes action to obtain the spoken name data associated with the number. FIGS. 2A and 2B provide examples of how the VMS1 may go about retrieving the spoken name data to announce or present to the sender.

FIGS. 2A–2B—VMS1 Obtains Spoken Name Data from VMS2

FIG. 2A is a flow diagram illustrating an exemplary method to provide a sender with an announcement of a spoken name for a requested mailbox or number. In other words, FIG. 2A illustrates an exemplary method for VMS1 15 to provide a sender using telephone 14 with the spoken name of a recipient associated with telephone 38 and VMS2 17.

Referring to FIG. 2A, after start 200, per block 202, VMS1 15 uses an LDAP query to query the RMD 24*a* for the subscriber profile data associated with the requested mailbox or number. The query from VMS1 15 to the RMD 24*a* may be referred to herein as a primary or initial query. The LDAP query includes the common name (CN), which is the number or mailbox number (plus the number of a submailbox, if applicable) of the recipient of the message. The LDAP query also includes an identification of the requesting VMS (in this case VMS1), an organizational attribute, and a country attribute, as used in a standard LDAP query. If no attribute fields are specifically requested by the LDAP query, the RMD supplies all of the available attributes in the subscriber profile data.

In response to the initial LDAP query, the RMD 24*a* uses the number or mailbox number to obtain the related profile data. Then in block 204, the RMD 24*a* provides an LDAP response to VMS1 15 with the subscriber profile data. The response from the RMD 24*a* to the VMS1 15 may be referred to as a primary or initial response. In this example, the RMD 24*a* does not contain the spoken name data for the recipient of the message. Thus, the RMD 24*a* sends invalid data in place of the spoken name data to alert the VMS1 15 that the RMD 24*a* does not contain the spoken name data. If the CN sent in VMS1's query is not for a valid subscriber, the RMD 24*a* sends an error message to VMS1 15 to notify VMS1 15 that the CN is not for a valid subscriber.

However, in the response, the RMD 24*a* includes an indication as to the location of the spoken name data or other identity or information for the recipient. For example, the RMD 24*a* may include the VMS ID, domain name, other identification, indicator, or profile data related to the recipient or the messaging platform serving the recipient. Importantly, the RMD 24*a* provides the identification for the messaging platform of the recipient of the message so that the VMS1 15 may obtain the spoken name data from the appropriate messaging platform. In this example, the RMD 24*a* provides the VMS1 15 with identification information such as a domain name as to VMS 2 17 as the serving platform of the recipient.

Upon receipt of the response, per block 206, VMS1 15 sends an LDAP query to VMS2 17 to request the spoken name data associated with the number (CN) of the recipient. The query from the VMS1 to the VMS 2 may be referred to herein as the secondary or follow-up query. The query to VMS2 includes the number (CN) or mailbox number provided by the sender. The query may also contain an encoding attribute that identifies the voice encoding format of the spoken name data preferred by VMS1. If appropriate, in addition, the query may contain one or more other attributes that identify the preferred format or configuration of other information requested by VMS1.

In response to the follow-up LDAP query, the VMS2 17 uses the number or mailbox number to obtain the spoken name data related to the identity (and any other requested information) associated with the number corresponding to the recipient. Utilizing an LDAP response, VMS2 17, per block 208, sends the spoken name data (and any other requested information) to VMS1 15. The response from the VMS2 to VMS 1 may be referred to as a secondary or follow-up response.

The spoken name data (and/or any other requested information) may be stored on VMS2 17 in the preferred voice encoding format (and/or any other format or configuration) identified in VMS1's query. In that case, VMS2 17 returns the spoken name date (and/or the other information) without conversion. If the spoken name data (and/or any other format or configuration) is in a different format or configuration, the VMS2 17 may convert the spoken name data (and/or the other information) into the preferred format or configuration. A preferred format may be the 32K Adaptive Differential Pulse code Modulation (ADPCM) format. Alternatively, rather than perform the conversion, the VMS2 17 may provide data or information with respect to the existing format or configuration of the spoken name data (and/or any other information). The VMS2 17 may set the appropriate value to the voice encoding attribute in the LDAP response to identify the encoding format used, and may carry out similar functions with respect to other information that the VMS1 15 may have requested in the query.

The VMS1 15 receives the response from VMS2 17, and as illustrated in block 210, VMS1 15 presents the spoken name data (and/or other information) in an announcement or in another fashion to the sender. The exemplary method of FIG. 2A ends in end block 212.

FIG. 2B illustrates the actions of the exemplary method of FIG. 2A, but in block diagram form using arrows to illustrate the actions among the pertinent elements of the system 10. FIG. 2B presents the relevant elements of the system 10 in simplified format for ease of explanation. In particular, this block diagram illustrates an exemplary method for VMS1 15 to interact with an intelligent network element (INE) such as an SCP and an other messaging platform in a messaging system to allow for the exchange of spoken name data (and/or other information) relating to mailboxes among messaging platforms of the messaging system 10.

Pursuant to FIG. 2B, in response to a sender indicating a desire to leave, forward, or reply to a message, the VMS1 15 has obtained or has retained a number or mailbox number for the recipient of the message. The VMS1 transmits a query to an INE such as SCP 22 for profile data relating to the recipient of the message. The VMS1 may be referred to as a requesting messaging platform because it is requesting information. The query may make use of a standardized protocol such as an LDAP query. See arrow 1 in FIG. 2B. The INE includes a directory 24a that has profile data for keeping track of which messaging platform serves which mailbox of the mailboxes in the messaging system.

The directory 24a also includes a controller (not illustrated) with a functional connection through the SCP (or otherwise) to the VMS1. The controller responds to the query by causing use of the profile data to obtain an indicator of the messaging platform that serves the recipient and that includes the particular spoken name data sought by VMS1. For example, the controller may make use of service package applications (SPAs) or other programming to have the appropriate indicator retrieved from the profile data. The indicator is included in a response from the directory to the requesting messaging platform. The response may make use of a standardized protocol such as an LDAP response. See arrow 2.

In response to receiving the indicator for the appropriate messaging platform, the VMS1 uses the indicator to obtain the particular spoken name data from the messaging platform. The VMS1 sends a query for the particular spoken name data to the VMS2. See arrow 3. The query may make use of a standardized protocol such as an LDAP query.

The VMS2 uses the information provided in the query, specifically the number (CN) or mailbox number, to obtain the spoken name data related to the identity associated with the number called by the sender. The VMS2 then provides the particular spoken name data in a response to the query from the VMS1. See arrow 4. The response may make use of a standardized protocol such as an LDAP response. Upon receiving the response with the spoken name data from the VMS2, the VMS1 then makes an announcement or otherwise provides the spoken name data to the sender. Advantageously, the sender is provided with confirmation that the number the sender indicated or dialed is associated with a person or other entity who is to be the recipient of the message from the sender.

Figure 3A:
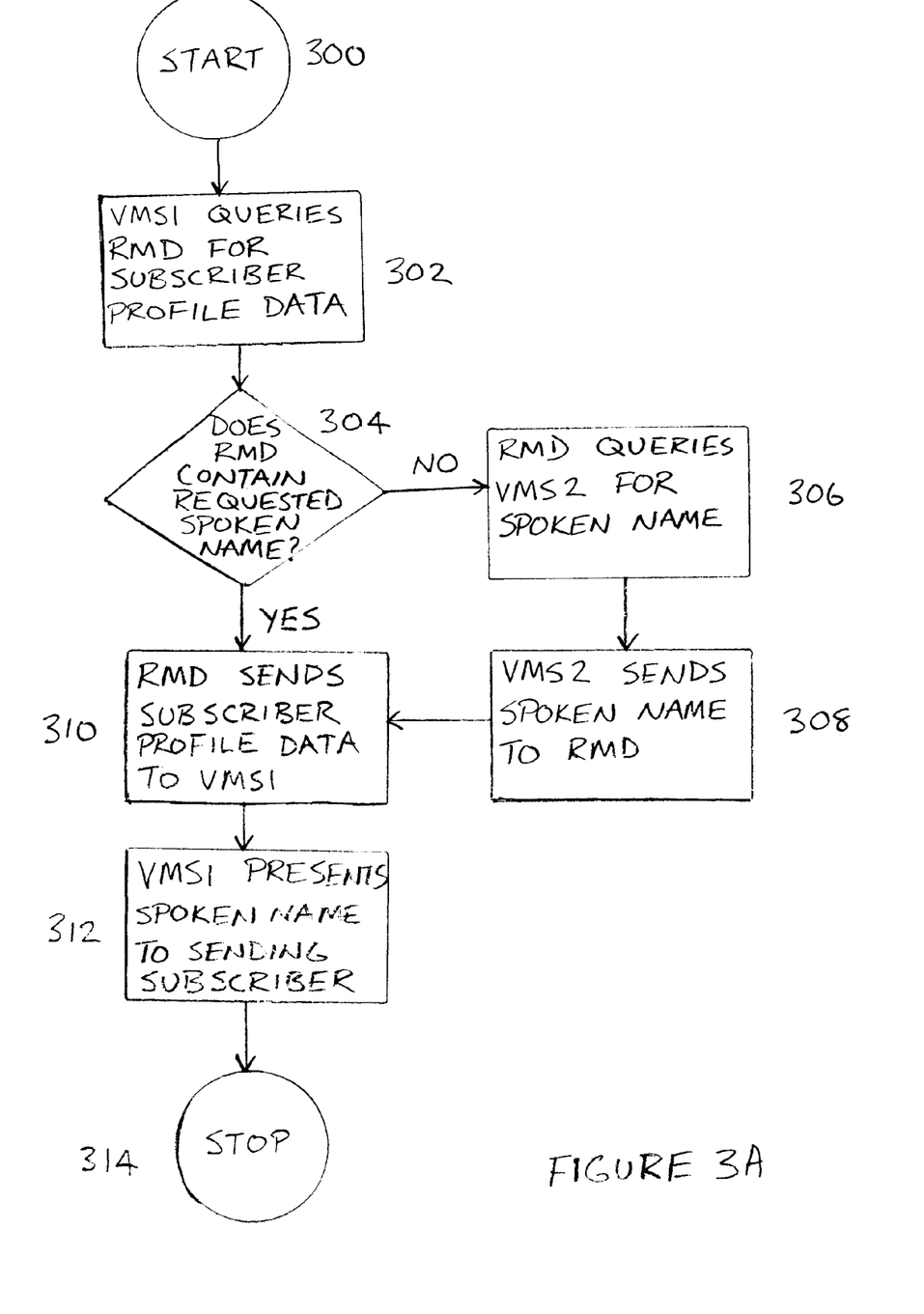
FIG. 3A is a flow chart illustrating another exemplary method of the present inventions.
Figure 3B:
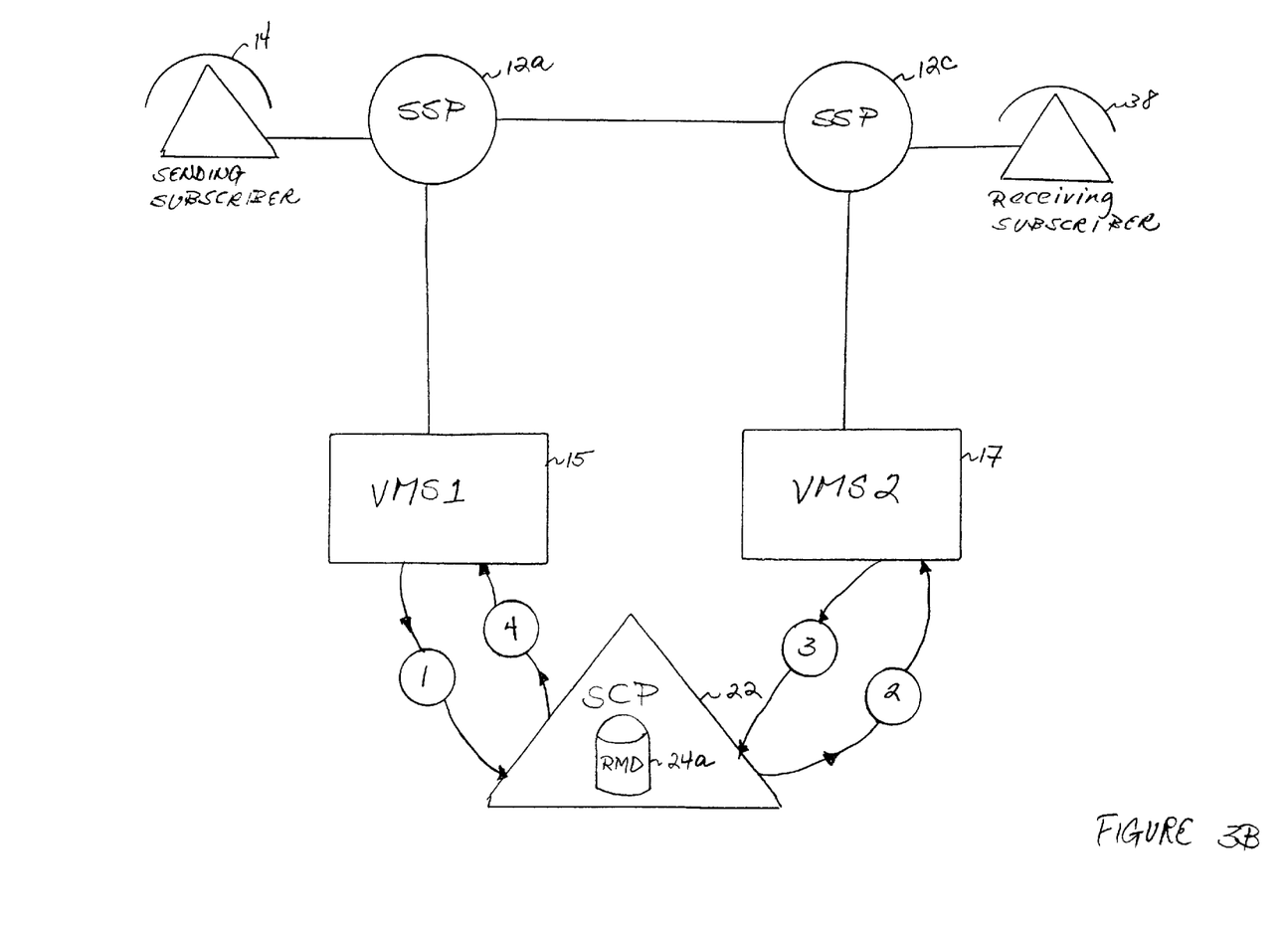
FIG. 3B is a block diagram illustrating the exemplary method of FIG. 3A.

FIGS. 3A–3B—Directory Obtains Spoken Name Data for VMS1

An alternative exemplary embodiment of the present inventions differs from the example of FIGS. 2A–2B in that in these examples the directory obtains the spoken name data for the VMS1. FIG. 3A is a flow diagram illustrating this alternative exemplary method. After start 300, per block 302, VMS1 15 uses a query to ask the RMD 24a for the subscriber profile data associated with the requested mailbox or number. The query from VMS1 to the RMD 24a may be referred to herein as a primary or initial query. The query may make use of a standardized protocol such as an LDAP query. The LDAP query includes the common name (CN), which is the number or mailbox number (plus the number of a submailbox, if applicable) of the recipient of the message. The LDAP query also includes an identification of the requesting VMS (in this case VMS1), an organizational attribute, an encoding attribute (if appropriate), and a country attribute, as used in a standard LDAP query. If necessary, the query may include other attributes with respect to information other than spoken namde data that may be requested. As in the example of FIGS. 2A–2B, if no attribute fields are specifically requested by the LDAP query, the RMD supplies all of the available attributes in the subscriber profile data.

Per block 304, a determination is made as to whether the RMD 24a has the spoken name data (and/or other information). The RMD 24a uses the number or mailbox number to check whether the RMD 24a includes the spoken name data (and/or other information). As explained above, the RMD 24a sends an error message to VMS1 15 if the calling line number sent in VMS1's query is not for a valid subscriber.

If the RMD 24a does not have the spoken name data (and/or other information), then the RMD 24a takes action to obtain the spoken name data (and/or other information). Preferably, the RMD 24a includes profile data for subscribers in the messaging system. The profile data at least keeps track of which messaging platform in the messaging system serves which subscribers. The RMD 24a uses the number or the mailbox number received in the query from the VMS1 to obtain an indication as to the location of the spoken name data (and/or other information) relating to the recipient of the message. Once the RMD 24a has obtained this indication (preferably from the profile data), the RMD 24a then sends a query to the appropriate messaging platform serving the number or mailbox number. The query may make use of a standardized protocol such as an LDAP query. The LDAP query from the RMD 24a to the other messaging platform may be referred to herein as a secondary or follow-up query. This query may include an encoding attribute, and other information as appropriate, and requests the spoken name data (and/or other information) as shown in block 306.

Then in block 308, in response to the query from the RMD 24a, the VMS2 17 uses the number or mailbox number to obtain the spoken name data (and/or other information) related to the recipient of the message. The VMS2 17 sends the spoken name data and the appropriate value in the voice encoding attribute (and/or other information or attributes) to RMD 24a via a response. The response may make use of a standardized protocol such as an LDAP response. The VMS2 17 may convert the spoken name data (and/or other information) into the format used by the VMS1 15. The response from the VMS2 to the RMD may be referred to as a secondary or follow-up response. The response may make use of a standardized protocol such as an LDAP response.

As shown in block 310, if the RMD 24a has the spoken name data (and/or other information), or once the RMD 24a receives the spoken name data (and/or other information) from VMS2 17, the RMD 24a sends the spoken name data (and/or other information) to VMS1 15. In some cases, this may mean that the RMD 24a sends its profile data related to the recipient including the spoken name data (and/or other information) retrieved from the VMS2 17. The RMD 24a sends the spoken name data (and/or other information) to the VMS1 in a response to the VMS1's query. This response from the RMS 24a may be referred to as a primary or initial response. The response may make use of a standardized protocol such as an LDAP response.

The VMS1 15 receives the response from the RMS 24a. Then, as per block 312, VMS1 presents or otherwise makes an announcement of the spoken name (and/or other information) to the sender. The exemplary method then ends in block 314.

FIG. 3B illustrates the actions of the exemplary method of FIG. 3A, but in block diagram form using arrows to illustrate the actions among the elements of the system 10. FIG. 3B presents the relevant elements of the system 10 in simplified format for ease of explanation. In particular, this block diagram illustrates an exemplary method for VMS1 15 to interact with an intelligent network element (INE) such as an SCP in a messaging system and an other messaging platform in a messaging system to allow for the exchange of spoken name data relating to mailboxes among messaging platforms of the messaging system 10.

Pursuant to FIG. 3B, in response to a sender indicating a desire to send a message, the VMS1 15 has obtained or has retained a number or mailbox number for the recipient of the message. The VMS1 transmits a query to an INE such as SCP 22 for profile data relating to the recipient of the message. The VMS1 may be referred to as a requesting messaging platform because it is requesting information. The query may be an LDAP query. See arrow 1 in FIG. 3B. The INE includes a directory 24a that has profile data for keeping track of which messaging platform serves which mailbox of the mailboxes in the messaging system.

The directory 24a also includes a controller (not illustrated) with a functional connection through the SCP (or otherwise) to the VMS1 and to other messaging platforms such as VMS2 17. The controller responds to the query from the VMS1 15 by causing use of the profile data in a query/response exchange over a connection to VMS2 17 to obtain the particular spoken name data from the other messaging platform. See arrow 2.

The VMS2 17 uses the information provided in the query, specifically the number (CN) or mailbox number, to obtain the spoken name data related to the identity associated with the number of the recipient. The VMS2 then provides the particular spoken name data in a response to the query from the directory 24a. See arrow 3.

In response to receipt of the particular spoken name data from the VMS2 17, the controller of the directory 24a causes the particular spoken name data to be transmitted in a response to the requesting platform. See arrow 4. Upon receiving the response with the spoken name data from the VMS2, the VMS1 then makes an announcement or otherwise provides the spoken name data to the sender. Advantageously, the sender is provided with confirmation that the number the sender dialed is associated with a person or other entity who is to be the recipient of the message from the sender.

Figure 4:
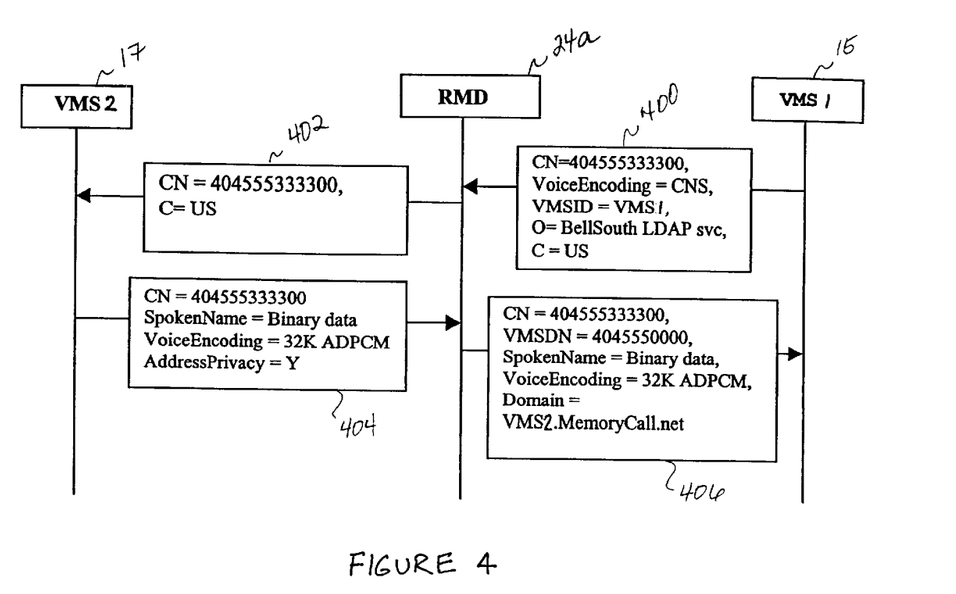
FIG. 4 is a flow diagram illustrating yet another exemplary method of the present inventions.

FIG. 4—Exemplary Flow Diagram

FIG. 4 illustrates an exemplary flow between VMS1 15, RMD 24a, and VMS2 17 when VMS1 is requesting the spoken name data from RMD 24a, and RMD 24a does not have the spoken name data as described in FIGS. 3A–3B above. In particular, as indicated by block 400, VMS1 15 sends a query to RMD 24a. The query includes: a number (CN) of 404555333300; a designation of the preferred type of voice encoding for the spoken name data, to-wit: VoiceEncoding=CNS; an identification for the VMS1, to-wit: VMSID=VMS1; an identification of the service provider, to-wit: BellSouth LDAP svc; and a country code, to-wit: C=US.

The RMD 24a does not include the spoken name data for the recipient. Thus, in this exemplary embodiment, the RMD 24a sends a query to VMS2 17. As indicated in block 402, the query includes the number (CN) of 404555333300 and a country code, to-wit: C=US. Other information may be included in the query as appropriate.

The VMS2 17 responds to the query with a response that includes, as indicated by block 404, the following information: the number (CN) of 404555333300; the spoken name data in binary form, to-wit: SpokenName=Binary data; a designation of the type of voice encoding used, to-wit: VoiceEncoding=32K ADPCM; and a designation regarding privacy of the address, to-wit: AddressPrivacy=Y.

Upon receipt of the response from the VMS2 17, the RMD 24a sends a response to the VMS1 15 including the spoken name data. As illustrated in block 406, the response to the VMS1 includes the number (CN) of 404555333300; an identification of the directory number of the VMS2 17, to-wit: VMSDN=4045550000; the spoken name data in binary form, to-wit: SpokenName=Binary data; and an identification of the domain name of the VMS2 17, to-wit: VMS2.MemoryCall.net.

Alternative Embodiments

In an alternative embodiment, the RMD 24a may be configured so as to contain the spoken name data for the subscribers of the messaging system. In this alternative, VMS1 15 queries RMD 24a as described with respect to block 302 in FIG. 3A, and the RMD responds to VMS1 15 as described with respect to block 310 in FIG. 3A.

In another alternative embodiment, VMS1 15 may be configured to have or to otherwise than described above obtain the domain name for VMS2 17, before querying the RMD 24a. In this embodiment, VMS1 15 may query VMS2 17 directly for the spoken name data as described in block 206 of FIG. 2A above without having to engage in a query/response exchange with the directory.

In summary, the present inventions include embodiments that provide confirmation to a sender that a message will be made available to a recipient associated with a number associated with the message the sender desires to send. Advantageously, the confirmation is the announcement of the spoken name or other information associated with the number generally corresponding to the spoken name or other information related to the recipient.

Given the foregoing disclosure of the exemplary embodiments of the present inventions, other embodiments will suggest themselves to those skilled in the art. Therefore, the scope of the present inventions is to be limited only by the claims below.

What is claimed is:

1. In a messaging system including at least a messaging platform (MP1) serving a sender and a second messaging platform (MP2) serving a recipient, and the messaging system including a directory functionally connected to the MP1, the directory including profile data related to numbers served by the messaging system, a method for the MP1 to present the sender with an identity associated with the recipient, the method comprising:

A. causing the MP1 to transmit an initial query including a number of the recipient to the directory;

B. in response to the initial query, causing the directory to use the number to obtain recipient profile data, the recipient profile data indicating the MP2 as including spoken name data related to the identity of the recipient;

C. in response to obtaining the recipient profile data and the recipient profile data indicating the MP2 as including the spoken name data, causing the directory to provide an initial response including the recipient profile data to the MP1;

D. in response to the initial response, causing the MP1 to use the recipient profile data to transmit a follow-up query including the number to the MP2;

E. in response to the follow-up query, causing the MP2 to use the number to obtain the spoken name data;

F. in response to obtaining the spoken name data, causing the MP2 to provide a follow-up response including the spoken name data to the MP1; and G. in response to the follow-up response, causing the MP1 to make a presentation of the spoken name data to the sender.

2. The method of claim 1, wherein the initial query, the initial response, the follow-up query, and the follow-up response are transmitted through use of a standardized protocol.

3. The method of claim 2, wherein the standardized protocol comprises a lightweight directory access protocol (LDAP).

4. In a messaging system including at least a first messaging platform (MP1) serving a sender and a second messaging platform (MP2) serving a recipient, and the messaging system including a directory functionally connected to the MP1 and the MP2, the directory including profile data related to numbers served by the messaging system, a method for the MP1 to present the sender with an identity of the recipient, the method comprising:

A. causing the MP1 to transmit an initial query including a number of the recipient to the directory;

B. in response to the initial query, causing the directory to use the number to obtain recipient profile data related to the number, the recipient profile data indicating the MP2 as including the spoken name data related to the number;

C. in response to obtaining the recipient profile data, causing the directory to use the recipient profile data to transmit a follow-up query including the number to the MP2;

D. in response to the follow-up query, causing the MP2 to use the number to obtain the spoken name data related to the number;

E. in response to obtaining the spoken name data, causing the MP2 to provide a follow-up response including the spoken name data to the directory;

F. in response to the follow-up response, causing the directory to provide an initial response including the spoken name data to the MP1; and G. in response to the initial response, causing the MP1 to make a presentation of the spoken name data to the sender.

5. The method of claim 4, wherein the initial query, the initial response, the follow-up query, and the follow-up response are transmitted through use of a standardized protocol.

6. The method of claim 5, wherein the standardized protocol comprises a lightweight directory access protocol (LDAP).

7. In a messaging system including at least a first messaging platform (MP1) serving a sender and a second messaging platform (MP2) serving a recipient, and the messaging system including a directory functionally connected to the MP1, the directory including profile data related to numbers served by the messaging system, a method to provide the MP1 with spoken name data so the MP1 may present the sender an identity associated with the recipient, the method comprising:

A. causing the directory to receive from the MP1 a query including a number of the recipient;

B. in response to the query, causing the directory to use the number to obtain recipient profile data, the recipient profile data indicating the MP2 as including the spoken name data related to the identity associated with the number;

C. in response to obtaining the recipient profile data, causing the directory to use the recipient profile data to obtain the spoken name data related to the identity associated with the number from the MP2; and D. in response to obtaining the spoken name data, causing the directory to provide a response including the spoken name data to the MP1.

8. The method of claim 7, wherein the query and the response are transmitted through use of a standardized protocol.

9. The method of claim 8, wherein the standardized protocol comprises a lightweight directory access protocol (LDAP).

10. In a messaging system serving mailboxes, a system to allow particular information relating to a particular mailbox to be exchanged between any messaging platforms of the messaging system so the particular information may be presented by one of the messaging platforms to a sender of a message to the particular mailbox, the system comprising:

A. a directory accessible through use of a standardized protocol by the messaging platforms of the messaging system, the directory including profile data for keeping track of which messaging platform serves which mailbox in the messaging system, and the directory operative to receive and respond through use of the standardized protocol to a request for particular profile data relating to the particular mailbox from any of the messaging platforms by providing the particular profile data to a requesting messaging platform, the particular profile data identifying a particular messaging platform having the particular information; and B. each of the messaging platforms of the messaging system being accessible through use of the standardized protocol to the directory or to other messaging platforms of the messaging system, each of the messaging platforms including mailbox information for each mailbox respectively served, and a messaging platform serving the sender of the message operative to obtain through use of the standardized protocol the particular profile information from the directory, operative to use the particular profile information to retrieve the particular information from the particular messaging platform, and operative to present the particular information to the sender of the message.

11. The system claim 10, wherein the standardized protocol comprises a lightweight directory access protocol (LDAP).

12. In a messaging system serving mailboxes, a system to allow particular information relating to a particular mailbox to be exchanged between any messaging platforms of the messaging system so the particular information may be presented by one of the messaging platforms to a sender of a message to the particular mailbox, the system comprising:

A. a directory accessible through use of a standardized protocol by the messaging platforms of the messaging system, the directory including profile data for keeping track of which messaging platform serves which mailbox in the messaging system, and the directory operative through use of the standardized protocol to receive to an initial request for the particular information relating to the particular mailbox from any of the messaging platforms as a requesting platform, the directory operative to respond to the initial request by obtaining particular profile data related to the particular mailbox, the particular profile data including identification of a particular messaging platform having the particular information, the directory operative to use the identification to obtain the particular information from the particular messaging platform, the directory operative to transmit an initial response including the particular information to the requesting platform; and B. each of the messaging platforms of the messaging system being accessible through use of the standardized protocol to the directory or to other messaging platforms of the messaging system, each of the messaging platforms including mailbox information for each mailbox respectively served, and a messaging platform serving the sender of the message operative as the requesting platform to obtain through use of the standardized protocol the particular information from the directory, and operative to present the particular information to the sender of the message.

13. The system claim 12, wherein the standardized protocol comprises a lightweight directory access protocol (LDAP).

14. An intelligent network element (INE) for use with a messaging system to allow for the exchange of spoken name data relating to mailboxes among messaging platforms of the messaging system, the INE comprising:

A. a connection to each messaging platform of the messaging system for exchange of queries and responses through use of a standardized protocol in the exchange with the messaging platforms;

B. a directory including profile data for keeping track of which messaging platform serves which mailbox of the mailboxes in the messaging system; and C. a controller connected to each connection to the messaging platforms and to the directory, and the controller being operative to respond to a query from a requesting messaging platform for particular spoken name data related to a mailbox served by an other messaging platform of the messaging platforms, the controller being operative to respond to the query by causing use of the profile data in a query/response exchange over a connection to the other messaging platform to obtain the particular spoken name data from the other messaging platform, and the controller being operative to provide a response including the particular spoken name data to the requesting platform.

15. The intelligent network element of claim 14, wherein the standardized protocol comprises a lightweight directory access protocol (LDAP).

16. An intelligent network element (INE) for use with a messaging system to allow for the exchange of spoken name data relating to mailboxes among messaging platforms of the messaging system, the INE comprising:

A. a connection to each messaging platform of the messaging system for exchange of queries and responses through use of a standardized protocol in the exchange with the messaging platforms;

B. a directory including profile data for keeping track of which messaging platform serves which mailbox of the mailboxes in the messaging system; and C. a controller connected to each connection to the messaging platforms and to the directory, and the controller being operative to respond to a query received from a requesting messaging platform for particular spoken name data related to a mailbox served by an other messaging platform of the messaging platforms, and the controller being operative to respond to the query by causing use of the profile data to obtain an indicator of the other messaging platform, and by causing the indicator to be included in a response to the requesting messaging platform, whereby the requesting messaging platform may use the indicator to obtain the particular spoken name data from the other messaging platform.

17. The intelligent network element of claim 16, wherein the standardized protocol comprises a lightweight directory access protocol (LDAP).

* * * * *